(12) United States Patent
Kim et al.

(10) Patent No.: US 9,996,836 B2
(45) Date of Patent: Jun. 12, 2018

(54) IC CHIP FOR PREVENTING IDENTIFICATION KEY LEAK AND AUTHORIZATION METHOD THEREOF

(75) Inventors: Dong Kyue Kim, Seoul (KR); Byong Deok Choi, Seoul (KR); Dong Hyun Kim, Gyeonggi-do (KR); Sang Seon Park, Gyeonggi-do (KR); Kwang Hyun Jee, Gyeonggi-do (KR)

(73) Assignee: ICTK CO., LTD., Gyeonggi-do (KR)

( * ) Notice: Subject to any disclaimer, the term of this patent is extended or adjusted under 35 U.S.C. 154(b) by 980 days.

(21) Appl. No.: 14/236,733

(22) PCT Filed: Aug. 10, 2011

(86) PCT No.: PCT/KR2011/005830
§ 371 (c)(1),
(2), (4) Date: Jan. 7, 2015

(87) PCT Pub. No.: WO2013/018947
PCT Pub. Date: Feb. 7, 2013

(65) Prior Publication Data
US 2015/0127537 A1 May 7, 2015

(30) Foreign Application Priority Data

Aug. 3, 2011 (KR) .................. 10-2011-0077271

(51) Int. Cl.
*G06K 5/00* (2006.01)
*G06Q 20/40* (2012.01)
(Continued)

(52) U.S. Cl.
CPC ......... *G06Q 20/4012* (2013.01); *G06F 21/75* (2013.01); *G06F 21/77* (2013.01);
(Continued)

(58) Field of Classification Search
CPC .......... G06F 21/75; G06F 21/77; G06F 21/85
(Continued)

(56) References Cited

U.S. PATENT DOCUMENTS 5,786,587 A * 7/1998 Colgate, Jr. ............ G06K 19/14
235/454
6,641,050 B2 * 11/2003 Kelley ................ G06K 19/073
235/380
(Continued)

FOREIGN PATENT DOCUMENTS

| CN | 1408187 A | 4/2003 |
|---|---|---|
| CN | 2613828 Y | 4/2004 |

(Continued)

OTHER PUBLICATIONS

Office Action, Chinese Application No. 201180072740.0, dated Feb. 3, 2016.
(Continued)

*Primary Examiner* — Daniel Hess
(74) *Attorney, Agent, or Firm* — Marshall, Gerstein & Borun LLP

(57) ABSTRACT

Disclosed are an IC chip for preventing identification key leak and an authorization method thereof. An IC chip capable of performing a financial function includes: a PIN supply unit for supplying a PIN used for authorization when performing a financial function using the IC chip; and a blocking unit for physically blocking the gap between the PIN supply unit and an input-output interface when the PIN is supplied to the outside through the input-output interface at an initial access of the IC chip.

12 Claims, 7 Drawing Sheets

(51) Int. Cl.
  *G06K 19/073*   (2006.01)
  *H04L 9/32*     (2006.01)
  *G06F 21/75*    (2013.01)
  *G06F 21/77*    (2013.01)
  *G06F 21/85*    (2013.01)

(52) U.S. Cl.
  CPC ....... *G06F 21/85* (2013.01); *G06K 19/07345* (2013.01); *H04L 9/3278* (2013.01)

(58) Field of Classification Search
  USPC ........................................................ 235/380
  See application file for complete search history.

(56) References Cited

U.S. PATENT DOCUMENTS 6,679,424 B2 *  1/2004  Hikita ................. G06K 19/073
                                                    235/380
8,868,923 B1 *  10/2014 Hamlet .................. G06F 21/00
                                                      326/8

FOREIGN PATENT DOCUMENTS

| | | |
|---|---|---|
| CN | 101019141 A | 8/2007 |
| CN | 101136073 A | 3/2008 |
| EP | 1004980 A2 | 5/2000 |
| JP | 04-258898 | 9/1992 |
| JP | 2003-303309 A | 10/2003 |
| JP | 2006-031576 A | 2/2006 |
| KR | 10-2005-0089883 | 7/2005 |
| KR | 10-2006-0025427 | 3/2006 |
| KR | 10-2007-0084351 | 8/2007 |
| KR | 10-2011-7005331 | 3/2011 |
| WO | WO-2010/035202 A1 | 4/2010 |
| WO | WO-2010076733 A1 | 7/2010 |

OTHER PUBLICATIONS

Office Action for Chinese Patent Application No. 201180072740.0, dated Sep. 26, 2016.
International Search Report for PCT/KR2011/005830, dated Aug. 30, 2012.

* cited by examiner

IC CHIP FOR PREVENTING IDENTIFICATION KEY LEAK AND AUTHORIZATION METHOD THEREOF

TECHNICAL FIELD

The present invention relates to an integrated circuit (IC) chip that may fundamentally prevent exposure of an identification key, for example, a personal identification number (PIN), which is used for authorizing use of the IC chip, and a method of authorizing the IC chip.

More particularly, the present invention relates to a process of activating a smart card and performing authorization when conducting a financial transaction, and to technology for preventing an external access to identification information, for example, a PIN, in the smart card after the smart card is activated.

BACKGROUND ART

Recently, an integrated circuit (IC) chip having a financial function, for example, a smart card used as a credit card, is being used as a payment means in lieu of cash because of the great convenience provided by use of the IC chip.

Despite the convenience, there have been reports of accidents, for example, physical duplication of the card and hacking of card numbers, associated with the IC chip having a financial function. Thus, a reliable identification process may be required.

The identification process may be performed by verifying unique information of a user, for example, a personal identification number (PIN), at a time of payment. Although the PIN may be an only means to authenticate the user, the PIN has a risk of being ineffective due to a PIN leak caused by, for example, hacking into a server of a financial institution.

For example, Korean Patent Publication No. 10-2007-0084351, titled "Secure Sensor Chip," discloses a method and device for providing a secure sensor chip with a controlled physical random function (CPUF) provided in a coded form for recording digital information regarding at least one physical parameter. However, although the secure sensor chip is applied to a credit card, a risk of the PIN leak due to a server of a financial institution being hacked may still exist.

In general, a financial institution, for example, a credit card company, issues a PIN to a user, the financial institution stores the PIN, and payment is authorized when the user correctly inputs the PIN issued by the financial institution. In this case, the financial institution may not be exempted from responsibility for unjustifiable use that may occur when the PIN is revealed by a security attack.

Thus, a conventional method of issuing and managing a PIN may pose the risk of the PIN leak caused by a security accident including a hacking attack on a financial institution.

DISCLOSURE OF INVENTION

Technical Goals

An aspect of the present invention provides an integrated circuit (IC) chip and an authorization method using the IC chip that may prevent a personal identification number (PIN) used for payment using the IC chip having a financial function from being leaked to other people other than a user.

Another aspect of the present invention provides an IC chip and an authorization method using the IC chip that may be managed by allowing a financial institution to store a PIN on the IC chip, for example, a smart card, instead of issuing the PIN to a user, and disclaim responsibility for leakage of a PIN.

Still another aspect of the present invention provides an IC chip and an authorization method using the IC chip that may prevent a PIN leak due to the PIN stored in the IC chip and may not require online transmission of the PIN when performing financial payment using the IC chip.

Technical Solutions

According to an aspect of the present invention, there is provided an integrated circuit (IC) chip to be used for performing a financial function, including a personal identification number (PIN) supply unit to supply a PIN to be used for authorization when performing the financial function using the IC chip, an input-output interface to transmit the PIN externally, and a blocking unit to physically block a connection between the PIN supply unit and the input-output interface when the PIN is supplied externally through the input-output interface subsequent to the IC chip being initially accessed.

The blocking unit may include at least one fuse and at least one switch to apply an overcurrent to each of the at least one fuse. Here, the overcurrent may refer to a current greater than or equal to a critical current and able to melt the at least one fuse. When the PIN is supplied externally through the input-output interface subsequent to the IC chip being initially accessed, the at least one switch may apply the overcurrent to the at least one fuse and physically block the connection between the PIN supply unit and the input-output interface.

The PIN supply unit may include a physically unclonable function (PUF) providing the PIN based on a circuit configuration.

The IC chip may further include an authorization unit to authorize use of the IC chip when a PIN received from a user matches the PIN supplied by the PIN supply unit as a result of comparing the PIN supplied by the PIN supply unit to the PIN received from the user.

The authorization unit may authorize the use of the IC chip when the PINs are matched by encoding and storing the PIN supplied by the PIN supply unit, encoding the PIN received from the user, and comparing the PINs.

The IC chip may further include an authorization unit to authorize the use of the IC chip based on the PIN supplied by the PIN supply unit and a special PIN included in the IC chip and used for authorizing the PIN received from the user.

The PIN supply unit may store a pre-input PIN and supply the stored PIN to be used for activation of the IC chap, and authorization when performing the financial function using the IC chip.

According to another aspect of the present invention, there is provided an integrated circuit (IC) chip to be used for performing a financial function, including a personal identification number (PIN) supply unit to store a PIN to be used for authorization when performing the financial function using the IC chip, an input-output interface to transmit the PIN stored in the PIN supply unit to an external terminal when the external terminal gains access to the IC chip, and a blocking unit to physically block a connection between the PIN supply unit and the input-output interface when a control signal is received from the external terminal.

According to still another aspect of the present invention, there is provided a terminal activating an integrated circuit (IC) chip to be used for performing a financial function. The terminal may gain access to a personal identification number (PIN) supply unit of the IC chip through an input-output interface of the IC chip, read and output the PIN of the IC chip supplied by the PIN supply unit, apply a control signal and a current to a blocking unit disposed between the PIN supply unit of the IC chip and the input-output interface of the IC chip, and block an electrical connection between the PIN supply unit of the IC chip and the input-output interface of the IC chip.

However, a physical subject performing the blocking of the electrical connection may be the terminal or at least a portion of a peripheral circuit disposed in or along with the IC chip. Although specific mention of the subject performing the blocking of the electrical connection is not made, performance of blocking is not to be construed as being limited to the terminal only.

According to yet another aspect of the present invention, there is provided an integrated circuit (IC) chip to be used for performing a financial function, including a personal identification number (PIN) supply unit to supply a PIN to be used for authorization when performing the financial function using the IC chip, an input-output interface to transmit the PIN supplied by the PIN supply unit when an external terminal gains access to the IC chip, an authorization unit to authorize, when a PIN is input to perform the financial function using the IC chip, the input PIN as a result of comparing the input PIN to the PIN supplied by the PIN supply unit and block the access to the IC chip when an incorrect PIN is input more than predetermined number of times, and a blocking unit to physically block a connection between the PIN supply unit and the input-output interface when the PIN is supplied externally through the input-output interface subsequent to the IC chip being initially accessed.

According to further another aspect of the present invention, there is provided a method of authorizing an integrated circuit (IC) chip to be used for performing a financial function, including supplying a PIN for authorization when performing the financial function, transmitting the supplied PIN externally subsequent to the IC chip being initially accessed, physically blocking extraction of the PIN, and authorizing use of the IC chip when a PIN received from a user matches the supplied PIN as a result of comparing the supplied PIN to the PIN received from the user.

Effects of Invention

In a case of payment performed using an integrated circuit (IC) chip having a financial function, a financial institution, for example, a credit card company, may not be required to keep a personal identification number (PIN) used for identifying a user and thus, a PIN leakage may be fundamentally prevented even from a security attack, for example, hacking into the financial institution.

Thus, the financial institution may disclaim a responsibility for unjustifiable use of a card that may be caused by the PIN leakage.

BEST MODE FOR CARRYING OUT THE INVENTION

Figure 1:
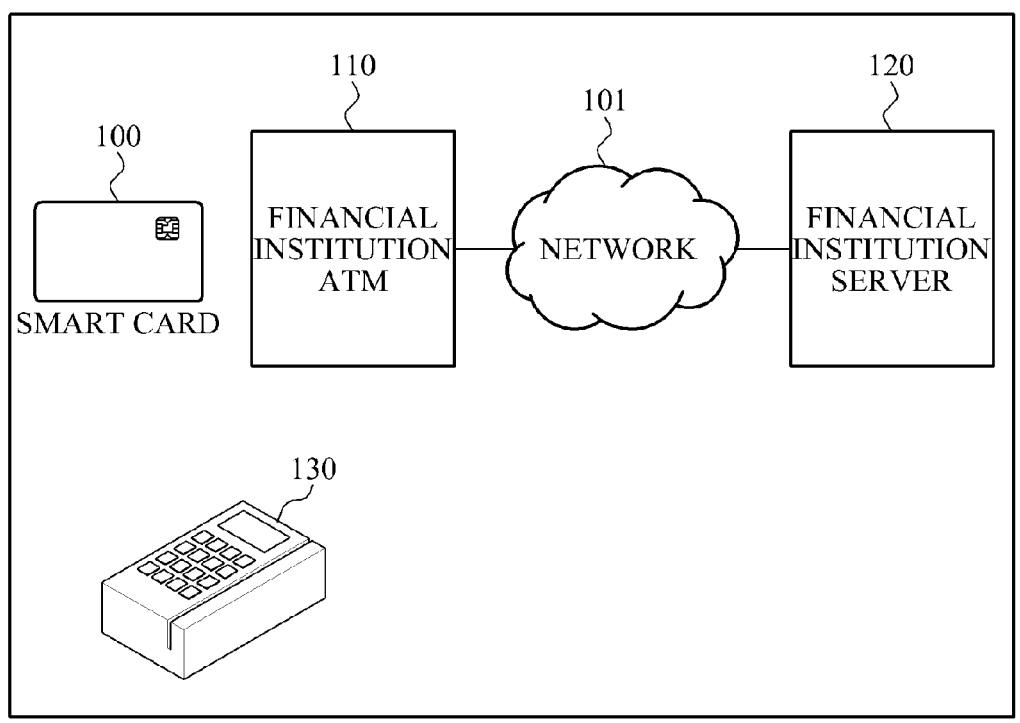
FIG. 1 is a conceptual diagram illustrating an integrated circuit (IC) chip preventing an identification key leak according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a conceptual diagram illustrating an integrated circuit (IC) chip preventing an identification key leak according to an embodiment of the present invention.

Referring to FIG. 1, the IC chip may be included in a smart card 100 that may perform a financial function, for example, credit payment. The IC chip to be used for the credit payment may provide an identification key in a form of a time invariant random number, for example, a personal identification number (PIN). The IC chip may include a physically unclonable function (PUF) to provide the PIN based on a circuit configuration.

The PUF may refer to technology for preventing reproduction of a digital device using a semiconductor processing deviation. The technology may relate to obtaining a unique digital value based on a fact that identical circuits have different wire delays, gate delays, and the like based on a process of configuring a circuit. In a case of providing the PIN using the PUF, the PIN may not be identifiable from the IC chip because the PUF is merely a sequence of identical semiconductor elements and accordingly, a PIN leak may be prevented in advance, despite the smart card 100 being acquired possessed by others.

When a user activates the IC chip in a terminal, for example, an automated teller machine (ATM) 110 of a financial institution, the IC chip may transmit the PIN to the ATM 110 only at an initial activation. The PIN transmitted to the terminal may be output to the user through a display or by an additional printout method. Here, the terminal may not play a role in the providing and storing of the PIN. However, the terminal may perform a simple role of allowing the IC chip to be activated, subsequent to the activation, and passing the provided PIN to the user.

The PIN passed on to the user may be known, or stored, only by the user. According to an embodiment, the IC chip may cut or completely isolate a path, physically and logically, through which the PIN may be supplied and thus, prevent the PIN from being supplied by any external accesses subsequent to the initial access.

To perform the cutting or isolating, the IC chip may include at least one fuse and at least one switch. Here, subsequent to the initial access to the PIN, the IC chip may apply an overcurrent to the fuse through the switch and cut the fuse to physically block an external access to the PIN.

According to another embodiment, the blocking of the external access to the PIN may be performed by the terminal, for example, the ATM 110. Here, the terminal may gain access to the IC chip through an input-output interface of the IC chip, read and output the PIN of the IC chip, apply a control signal and a current to a blocking unit disposed between a PIN supply unit and the input-output interface of the IC chip, and block an electrical connection between the PIN supply unit and the input-output interface of the IC chip.

Subsequently, the terminal may inform a financial institution server 120, through a network 101, of the smart card 100 including the IC chip being issued to allow the smart card 100 to perform a function as a general card through an end terminal 130 used at an affiliated store.

Here, the financial institution server 120 may not store the PIN provided by the IC chip in a separate server or provide the PIN to a third party, other than the user. Thus, the PIN of the user may not be leaked by a security attack, for example, hacking into the financial institution server 120 and thus, the financial institution may be exempted from responsibility involved with an illicit use of the card caused by the PIN leak.

According to an embodiment, in order to authorize use of the smart card 100, the IC chip may verify whether a PIN input by the user to make use of the IC chip, after the activation, matches the PIN provided by the IC chip. Here, the PIN provided by the IC chip may be encoded and stored and thus, the verifying may be performed after encoding the input PIN.

Figure 2:
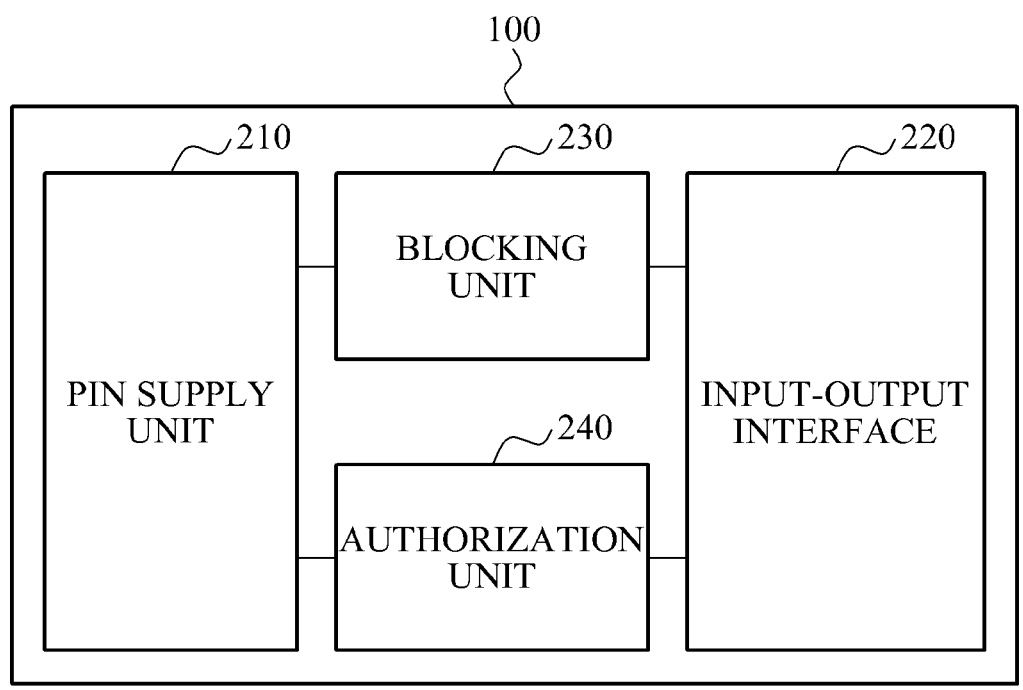
FIG. 2 is a block diagram illustrating a configuration of an IC chip according to an embodiment of the present invention.

FIG. 2 is a block diagram illustrating a configuration of an IC chip according to an embodiment of the present invention. Hereinafter, a detailed description of the configuration and a function of the IC chip will be provided with reference to FIG. 2.

A smart card 100 may include a PIN supply unit 210, an input-output interface 220, a blocking unit 230, and an authorization unit 240.

The PIN supply unit 210 performing a function of supplying a PIN may supply, using a PUF as described in the foregoing, the PIN used for authorization when performing a financial function using the IC chip. However, the PIN supply unit 210 may not be limited to the function, but may be configured to store a pre-input PIN upon request by a related operator and supply the stored PIN to be used for authorization when performing the financial function using the IC chip. For example, the PIN supply unit 210 may be provided in a form of a nonvolatile memory, for example, an electrically erasable and programmable read only memory (EEPROM). Here, the smart card 100 may store a random number of PINs in the EEPROM and supply a PIN as an external input PIN to the user, and authorize the user after comparing the PIN input by the user to the PIN stored in the EEPROM.

The input-output interface 220 may externally transmit the PIN supplied by the PIN supply unit 210 subsequent to the IC chip being initially accessed.

According to an embodiment, the blocking unit 230 may be disposed between the PIN supply unit 210 and the input-output interface 220 and physically block a connection between the PIN supply unit 210 and the input-output interface 220 when the PIN is supplied to an external terminal through the input-output interface 220 subsequent to the IC chip being initially accessed.

Thus, when the PIN supply unit 210 supplies the PIN including a PUF, the PIN may exist simply in a form of hardware in the smart card 100 and a subsequent extraction of the PIN may be permanently enabled.

According to an embodiment, the blocking unit 230 may include at least one fuse and at least one switch to apply an overcurrent to the at least one fuse. Here, the overcurrent may be a current greater than or equal to a critical current that may melt the at least one fuse.

Here, when the PIN is supplied externally through the input-output interface 220 subsequent to the IC chip being initially accessed, the at least one switch may apply the overcurrent to the at least one fuse and physically block the connection between the PIN supply unit 210 and the input-output interface 220. A more detailed description of a configuration of the blocking unit 230 will be provided with reference to FIGS. 3 through 6.

When the authorization unit 240 receives a PIN input by the user through the input-output interface 230 from the external terminal, for example, a financial institution ATM, the authorization unit 240 may compare the PIN supplied by the PIN supply unit 210 to the PIN received from the user, and authorize use of the IC chip when the PIN received from the user matches the PIN supplied by the PIN supply unit 210.

Here, the authorization unit 240 may authorize the use of the IC chip by encoding and storing the PIN supplied by the PIN supply unit 210, encoding the PIN received from the user, and comparing the PIN received from the user to the encoded and stored PIN.

Here, PINs to be stored in the authorization unit 240 may be encoded based on an encoding algorithm and thus, it may not be possible, in principle, to find an original PIN prior to the encoding based on the encoded PIN, although verifying whether the PIN input by the user is identical to the encoded and stored PIN may be possible. Thus, although a person finds and possesses the smart card 100 and is able to extract the encoded PIN stored in the authorization unit 240, it may not be possible for the person to use the smart card 100 using the encoded PIN.

Also, the authorization unit 240 may authorize the use of the IC chip based on the PIN supplied by the PIN supply unit 210 and a special PIN included in the IC chip and used for authorization of the PIN received from the user. For example, the PIN supply unit 210 may include a first PUF and a second PUF. Here, a PIN supplied by the first PUF may be used as an external input PIN for performing the financial function. Also, a value obtained by indexing the PIN supplied by the first PUF to a PIN supplied by the second PUF may be used as a final PIN to authorize the IC chip. Here, the PIN supplied by the second PUF may not be extracted by any methods, nor configured to authorize the use of the IC chip through an exclusive or (XOR) gate with the PIN supplied by the first PUF. Thus, although the PIN supplied by the first PUF is leaked due to inattentiveness of the user, it may not be possible to reproduce the final PIN.

When the PIN input by the user is authorized, the authorization unit 240 may allow the smart card 100 to perform a general card function in response to an input by the user. However, when an incorrect PIN is input more than a predetermined number of times, the authorization unit 240 may block an access to the IC chip and not allow the smart card 100 to be used.

FIGS. 3 through 6 are circuit diagrams illustrating an operation of a blocking unit 230 of an IC chip according to an embodiment of the present invention.

Figure 3:
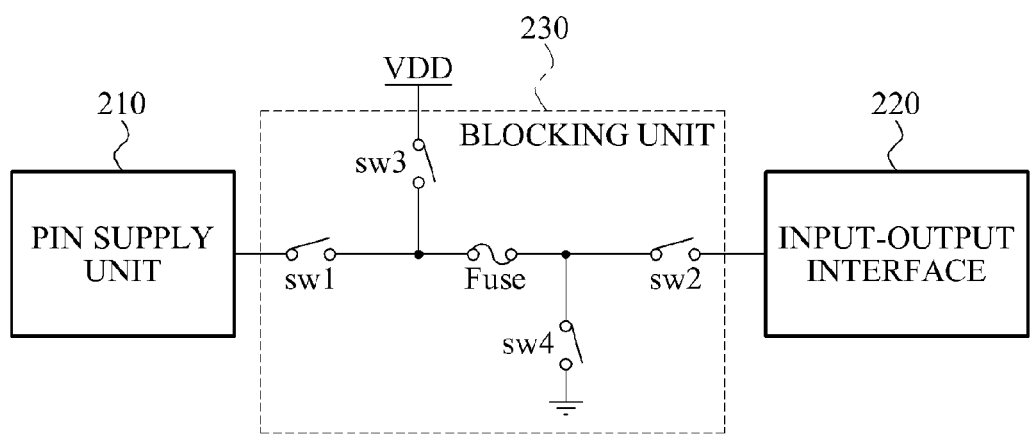
FIGS. 3 through 6 are circuit diagrams illustrating operation of a blocking unit of an IC chip according to an embodiment of the present invention.

Referring to FIG. 3, the blocking unit 230 may be disposed between a PIN supply unit 210 and an input-output interface 220, and include at least one fuse and at least one switch. Although FIG. 3 illustrates an example of the blocking unit 230 provided with one fuse and four switches, a number and positions of the fuse and the switches may be changed in response to a request by a related operator.

The blocking unit 230 may control each of the switches at a time of an initial access to the IC chip, for example, to issue a smart card, and allow a PIN supplied by the PIN supply unit 210 to be transmitted externally through the input-output interface 220. When the PIN is transmitted externally, the blocking unit 230 may control each of the switches to allow an overcurrent to flow in a circuit using a power supply, for example, VDD, to melt the fuse and physically block a connection between the PIN supply unit 210 and the input-output interface 220.

When a control signal is received from an external terminal, the blocking unit 230 may control, based on the control signal, each of the switches to allow the overcurrent to flow in the fuse and physically block the connection between the PIN supply unit 210 and the input-output interface 220.

Figure 4:
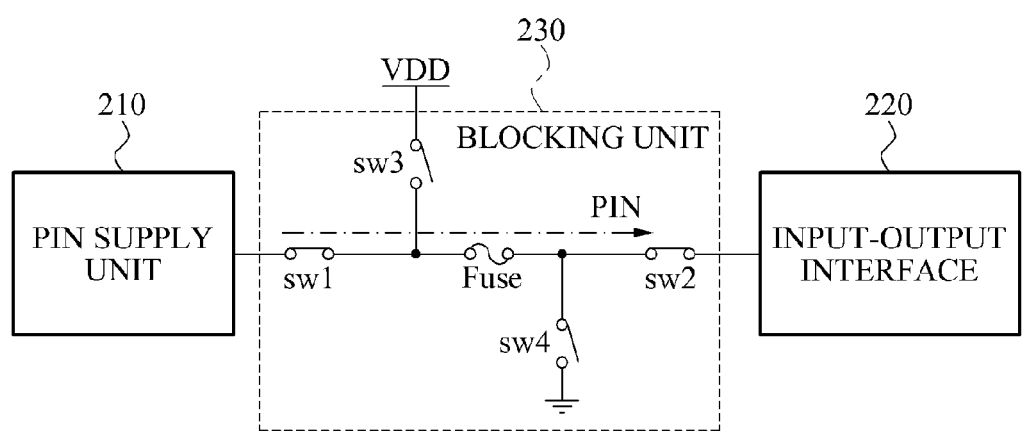
Figure 5:
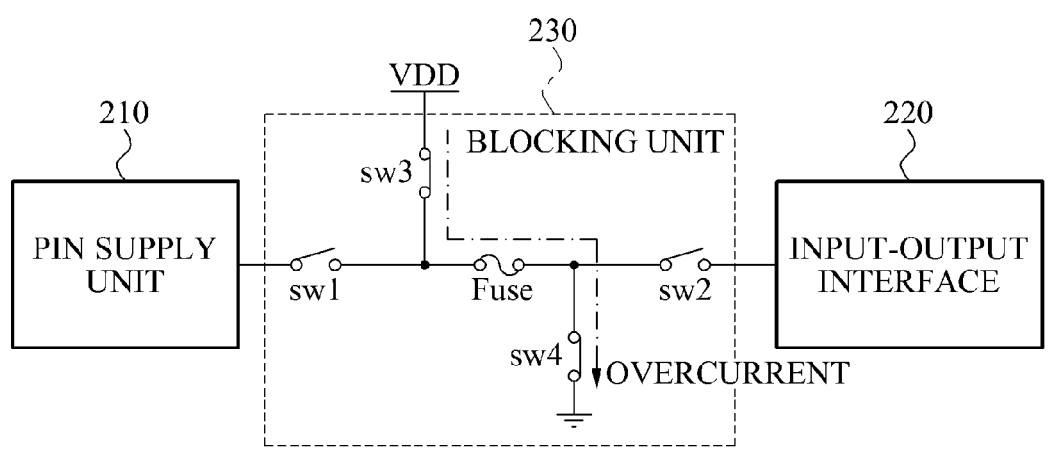

FIG. 4 illustrates an example in which a PIN supplied by a PIN supply unit 210 is transmitted to an input-output interface 220 by closing a first switch and a second switch. FIG. 5 illustrates an example in which an overcurrent flows in a fuse by closing a third switch and a fourth switch.

The blocking unit 230 may generate the control signal or receive the control signal from an external terminal to externally supply the PIN of the PIN supply unit 210 based on the control signal or block the PIN from being supplied externally. For example, as shown in FIG. 4, when "1" is applied as the control signal, the first switch and the second switch may be closed, but the third switch and the fourth switch may be open. Accordingly, the PIN supplied by the PIN supply unit 210 may be transmitted to the external terminal through the input-output interface 220.

Figure 6:
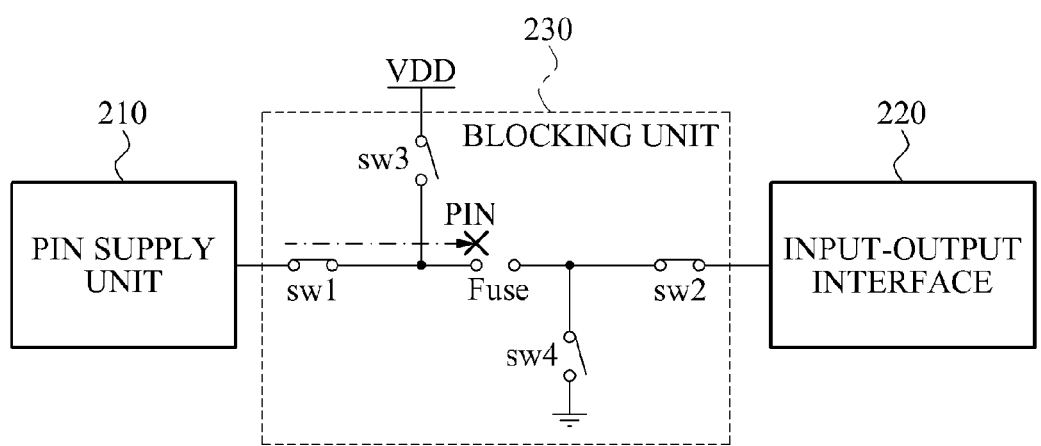

Conversely, as shown in FIG. 5, when "0" is applied as the control signal, the first switch and the second switch may be open, but the third switch and the fourth switch may be closed. Accordingly, as shown in FIG. 6, although the first switch and the second switch are closed, the overcurrent may flow in the fuse, the connection between the PIN supply unit 210 and the input-output interface 220 may be disconnected due to the melted fuse, and transmission of the PIN may be physically and completely blocked.

Figure 7:
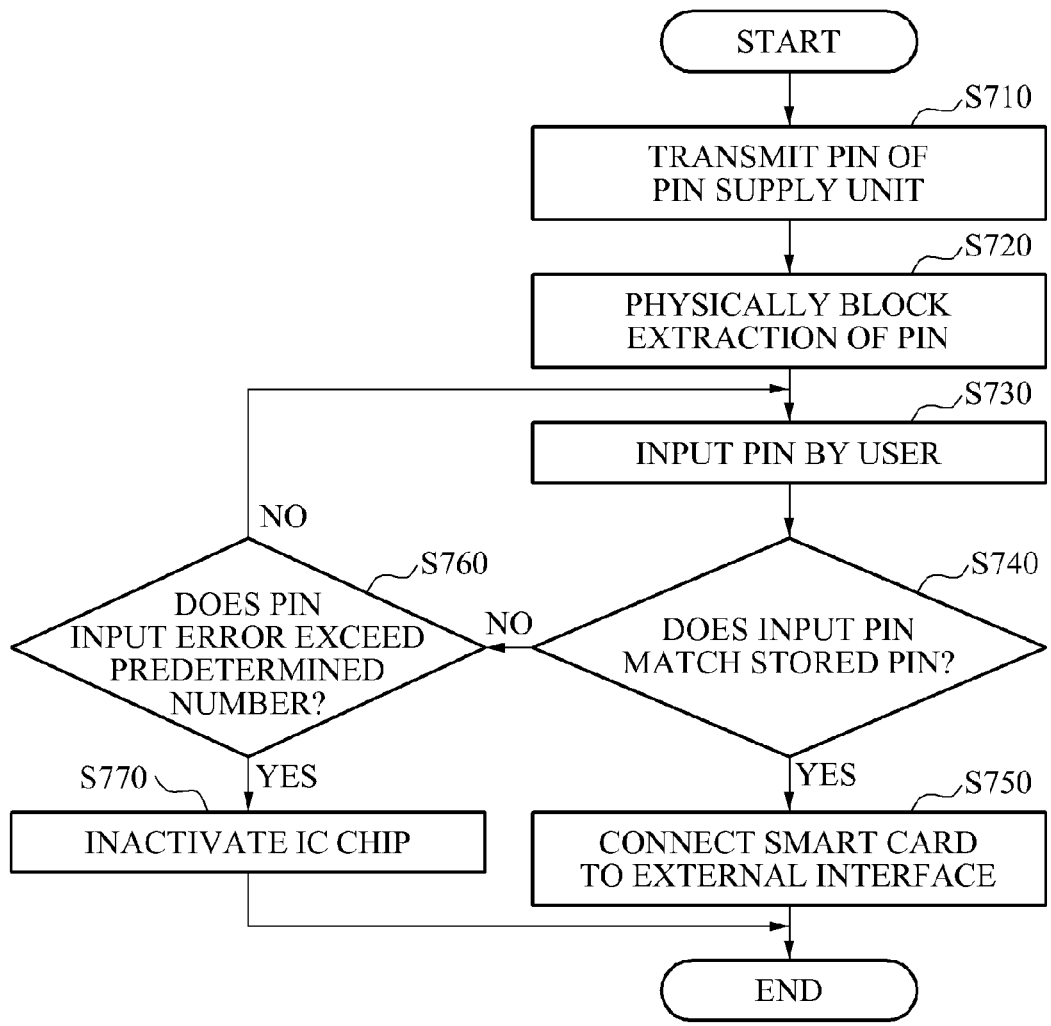
FIG. 7 is a flowchart illustrating a method of authorizing an IC chip according to an embodiment of the present invention.

FIG. 7 is a flowchart illustrating a method of authorizing an IC chip according to an embodiment of the present invention.

When a user is issued a smart card including the IC chip through an external terminal, a PIN generated or stored in a PIN supply unit subsequent to an initial access to the IC chip may be transmitted to the external terminal through an input-output interface in operation S710. Here, the terms "generate or store" described in the foregoing is interchangeably described herein as "provide" or "supply." The external terminal may display the received PIN on a display or output the received PIN to the user by applying an additional method, for example, a printout method.

In operation S720, a blocking unit of the IC chip may physically block a connection between the PIN supply unit and the input-output interface and thus, physically block extraction of the PIN.

When the user uses the smart card registered using the method and the user inputs a PIN to an end terminal of an affiliated store in operation S730, an authorization unit of the IC chip may authorize the PIN by verifying whether the received PIN matches the PIN stored in the authorization unit. Here, when the PIN stored in the authorization unit is encoded and stored, the authorization unit may encode the PIN input by the user and verify the match of the PINs by comparing the encoded PIN input by the user to the encoded and stored PIN.

When the authorization unit determines that the PINs are matched, the authorization unit may connect the smart card to an external interface in operation S750 and allow the smart card to perform a financial function.

However, when an incorrect PIN is input by the user more than a predetermined number of times, for example, three times, in operation S760, the authorization unit may inactivate the IC chip by blocking an access to the IC chip.

The IC chip for preventing a leak of an identification key and the method of authorizing the IC chip disclosed herein is not limited to authorizing the smart card, but may be used for authorizing a micro secure digital (SD) card, a universal subscriber identity module (USIM) card, a credit card, and the like. Also, the discloser may be used to various fields of digital technology requiring user identification and authorization.

Also, the discloser may be applied, as a gate, to an existing credit card or debit card to activate a smart card chip. Here, the discloser may be used without modifications to a method of using an existing financial payment system. For example, when the IC chip according to an embodiment of the present invention is used for a smart card, a user authentication process may be preferentially performed. Here, when the user authentication fails, an error message may be output. When the user authentication succeeds, the smart card may be activated and an interface signal sent.

Further, according to an embodiment of the present invention, the IC chip may perform the user authorization and thus, a financial institution, for example, a credit card company, may not need to keep a PIN. Accordingly, the PIN of the user may not be leaked by a security attack, for example, hacking into the financial institution, and thus, the financial institution may disclaim responsibility for unjustifiable use that may occur due to the PIN leak.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

100: Smart card
101: Network
110: Financial institution ATM
120: Financial institution server

The invention claimed is:

1. An integrated circuit (IC) chip to be used for performing a financial function, the IC chip comprising:
    a personal identification number (PIN) supply unit to supply a PIN to be used for authorization when performing the financial function using the IC chip;
    an input-output interface to transmit the PIN externally;
    a blocking unit to physically block a connection between the PIN supply unit and the input-output interface when the PIN is transmitted externally through the input-output interface subsequent to the IC chip being initially accessed; and
    an authorization unit to, with the connection between the PIN supply unit and the input-output interface physically blocked, authorize use of the IC chip when a PIN received from a user matches the PIN supplied by the PIN supply unit as a result of comparing the PIN supplied by the PIN supply unit to the PIN received from the user.

2. The IC chip of claim 1, wherein the blocking unit comprises at least one fuse and at least one switch to apply an overcurrent to each of the at least one fuse, and
    wherein the overcurrent is a current greater than or equal to a critical current and is able to melt the at least one fuse, and wherein, when the PIN is transmitted externally through the input-output interface subsequent to the IC chip being initially accessed, the at least one switch applies the overcurrent to the at least one fuse and physically blocks the connection between the PIN supply unit and the input-output interface.

3. The IC chip of claim 1, wherein the PIN supply unit comprises a physically unclonable function (PUF) providing the PIN using a semiconductor manufacturing process deviation.

4. The IC chip of claim 1, wherein the authorization unit authorizes use of the IC chip when the PINs are matched by encoding and storing the PIN supplied by the PIN supply unit, encoding the PIN received from the user, and comparing the PINs.

5. The IC chip of claim 1, further comprising:
an authorization unit to authorize use of the IC chip based on the PIN supplied by the PIN supply unit and a special PIN comprised in the IC chip and used for authorizing a PIN received from a user.

6. The IC chip of claim 1, wherein the PIN supply unit stores a pre-input PIN and supplies the stored PIN to be used for authorization when performing the financial function using the IC chip.

7. An integrated circuit (IC) chip to be used for performing a financial function, the IC chip comprising:
a personal identification number (PIN) supply unit to store a PIN to be used for authorization when performing the financial function using the IC chip;
an input-output interface to transmit the PIN stored in the PIN supply unit to an external terminal when the external terminal gains access to the IC chip;
a blocking unit to physically block a connection between the PIN supply unit and the input-output interface when a control signal is received from the external terminal; and
an authorization unit to, with the connection between the PIN supply unit and the input-output interface blocked, authorize use of the IC chip when a PIN received from a user matches the PIN supplied by the PIN supply unit as a result of comparing the PIN supplied by the PIN supply unit to the PIN received from the user.

8. The IC chip of claim 7, wherein the blocking unit comprises at least one fuse and a switch to apply a current to the at least one fuse and, when the control signal is received, physically blocks the connection between the PIN supply unit and the input-output interface by applying an overcurrent that is greater than or equal to a critical current and is able to melt each of the at least one fuse, through the switch.

9. A terminal activating an integrated circuit (IC) chip to be used for performing a financial function, the terminal:
gains access to a personal identification number (PIN) supply unit of the IC chip through an input-output interface of the IC chip and reads and outputs a PIN of the IC chip supplied by the PIN supply unit;
applies a control signal and a current to a blocking unit disposed between the PIN supply unit of the IC chip and the input-output interface of the IC chip, and blocks an electrical connection between the PIN supply unit of the IC chip and the input-output interface of the IC chip; and
authorizes, with the connection between the PIN supply unit and the input-output interface blocked, use of the IC chip when a PIN received from a user matches the PIN supplied by the PIN supply unit as a result of comparing the PIN supplied by the PIN supply unit to the PIN received from the user.

10. An integrated circuit (IC) chip to be used for performing a financial function, the IC chip comprising:
a personal identification number (PIN) supply unit to supply a PIN to be used for authorization when performing the financial function using the IC chip;
an input-output interface to transmit the PIN supplied by the PIN supply unit to an external terminal when the external terminal gains access to the IC chip;
a blocking unit to physically block a connection between the PIN supply unit and the input-output interface when the PIN is supplied externally through the input-output interface subsequent to the IC chip being initially accessed; and
an authorization unit to, with the connection between the PIN supply unit and the input-output interface blocked, authorize use of the IC chip when a PIN received from a user matches the PIN supplied by the PIN supply unit as a result of comparing the PIN supplied by the PIN supply unit to the PIN received from the user.

11. The IC chip of claim 10, wherein the blocking unit comprises at least one fuse and at least one switch to apply an overcurrent to each of the at least one fuse, and
wherein the overcurrent is a current greater than or equal to a critical current and is able to melt the at least one fuse, and
wherein the at least one switch applies the overcurrent to the at least one fuse and physically blocks the connection between the PIN supply unit and the input-output interface when the PIN is transmitted externally through the input-output interface subsequent to the IC chip being initially accessed.

12. A method of authorizing an integrated circuit (IC) chip to be used for performing a financial function, the method comprising:
supplying, via a personal identification number (PIN) supply unit, a PIN for authorization when performing the financial function;
transmitting, to an input-output interface, the supplied PIN externally, subsequent to the IC chip being initially accessed;
physically blocking, by a blocking unit, extraction, via the PIN supply unit, of the PIN; and
authorizing use of the IC chip when a PIN received from a user matches the supplied PIN, via an authorization unit, as a result of comparing the supplied PIN to the PIN received from the user.

* * * * *